United States Patent
Chen et al.

(10) Patent No.: US 8,914,696 B2
(45) Date of Patent: Dec. 16, 2014

(54) FLASH MEMORY READ SCRUB AND CHANNEL TRACKING

(75) Inventors: Zhengang Chen, San Jose, CA (US); Earl T. Cohen, Oakland, CA (US)

(73) Assignee: Seagate Technology LLC, Cupertino, CA (US)

( * ) Notice: Subject to any disclaimer, the term of this patent is extended or adjusted under 35 U.S.C. 154(b) by 157 days.

(21) Appl. No.: 13/597,489

(22) Filed: Aug. 29, 2012

(65) Prior Publication Data

US 2014/0068365 A1 Mar. 6, 2014

(51) Int. Cl.
- *G06F 11/00* (2006.01)
- *G06F 11/30* (2006.01)
- *G08C 25/00* (2006.01)
- *H03M 13/00* (2006.01)
- *H04L 1/00* (2006.01)

(52) U.S. Cl.
USPC ........................................ 714/746

(58) Field of Classification Search
CPC ........ G11C 6/10; G11C 29/028; G11C 29/50; G11C 29/50004; G11C 29/52; G11C 16/3431; G11C 11/1068; G11C 11/1072; G11C 2201/81; G11C 16/04; G11C 2029/5006; G11C 2029/5004; G11C 16/28; G11C 29/02; G11C 29/42; G11C 29/026; G11C 8/10; G06F 11/106

See application file for complete search history.

(56) References Cited

U.S. PATENT DOCUMENTS

| | | | | |
|---|---|---|---|---|
| 5,657,332 | A * | 8/1997 | Auclair et al. | 714/763 |
| 7,012,835 | B2 * | 3/2006 | Gonzalez et al. | 365/185.11 |
| 7,477,547 | B2 | 1/2009 | Lin | 365/185.09 |
| 8,214,700 | B2 | 7/2012 | Chen | 714/721 |
| 8,315,092 | B2 * | 11/2012 | Strasser et al. | 365/185.03 |
| 2005/0073884 | A1 * | 4/2005 | Gonzalez et al. | 365/185.02 |
| 2010/0131809 | A1 | 5/2010 | Katz | 714/719 |
| 2010/0332949 | A1 | 12/2010 | d'Abreu et al. | 714/766 |
| 2011/0182119 | A1 * | 7/2011 | Strasser et al. | 365/185.03 |
| 2012/0005558 | A1 | 1/2012 | Steiner et al. | 714/773 |
| 2012/0233391 | A1 * | 9/2012 | Frost et al. | 711/103 |
| 2013/0031431 | A1 * | 1/2013 | Sharon et al. | 714/719 |

\* cited by examiner

*Primary Examiner* — Guerrier Merant

(74) *Attorney, Agent, or Firm* — Christopher P. Maiorana, PC

(57) ABSTRACT

An apparatus having a first circuit and a second circuit is disclosed. The first circuit may be configured to (i) read data from a region of a memory circuit during a read scrub of the region and (ii) generate a plurality of statistics based on (a) the data and (b) one or more bit flips performed during an error correction of the data. The memory circuit is generally configured to store the data in a nonvolatile condition. One or more reference voltages may be used to read the data. The second circuit may be configured to (i) update a plurality of parameters of the region based on the statistics and (ii) compute updated values of the reference voltages based on the parameters.

20 Claims, 12 Drawing Sheets

FLASH MEMORY READ SCRUB AND CHANNEL TRACKING

The present application is related to co-pending U.S. application Ser. No. 13/555,444, filed Jul. 23, 2012, co-pending U.S. application Ser. No. 13/464,433 filed May 4, 2012, and co-pending international application PCT/US2012/021682, international filing date of Jan. 18, 2012, all of which are incorporated by reference.

FIELD OF THE INVENTION

The present invention relates to nonvolatile memories generally and, more particularly, to a method and/or apparatus for implementing flash memory read scrub and channel tracking.

BACKGROUND OF THE INVENTION

For a memory with an error correction code (i.e., ECC) support, information is stored with redundant bits as ECC parity. Due to a variety of noise sources, errors can occur when reading the information from the memory. If a severity of the errors does not exceed the error correction capability of the ECC, the information can be corrected. However, ECCs are limited and the available space in the memory for the redundant bits is finite. Therefore, certain error patterns are not correctable by the ECC and so are called uncorrectable errors. Typically, the error correction capability is measured in the number of incorrect bits that can be corrected by the ECC. To avoid single-bit errors accumulating into multi-bit errors that are uncorrectable, a memory scrubbing technique is commonly implemented. The scrubbing technique is a background task that reads the information stored in memory periodically and detects and/or corrects errors with an ECC decoder. A frequency of the memory scrubbing is chosen such that uncorrectable errors are unlikely to occur before a next scrub. Memory scrubbing is used in volatile memories, such as dynamic random access memory (i.e., DRAM) and static random access memory (i.e., SRAM).

For nonvolatile memories, such as flash memory, errors also accumulate over time. Memory scrubbing of nonvolatile memories is useful as a precaution against the uncorrectable errors. However, due to different characteristics, flash memory scrubbing carries different implications than traditional scrubbing techniques for DRAM or SRAM.

It would be desirable to implement a flash memory read scrub and channel tracking.

SUMMARY OF THE INVENTION

The present invention concerns an apparatus having a first circuit and a second circuit. The first circuit may be configured to (i) read data from a region of a memory circuit during a read scrub of the region and (ii) generate a plurality of statistics based on (a) the data and (b) one or more bit flips performed during an error correction of the data. The memory circuit is generally configured to store the data in a nonvolatile condition. One or more reference voltages may be used to read the data. The second circuit may be configured to (i) update a plurality of parameters of the region based on the statistics and (ii) compute updated values of the reference voltages based on the parameters.

The objects, features and advantages of the present invention include providing a flash memory read scrub and channel tracking that may (i) reduce read error rates, (ii) track channel parameters for multiple data groups, (iii) track the channel parameters during read scrubs, (iv) operate with nonvolatile memory, such as NAND flash memory, (v) operate with solid state drives, (vi) adjust a reference voltage used by a memory to read data, (vii) adjust soft-decision decoding to account for channel parameter drifting, (viii) operate with different data group granularity and/or (ix) be implemented in an integrated circuit.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
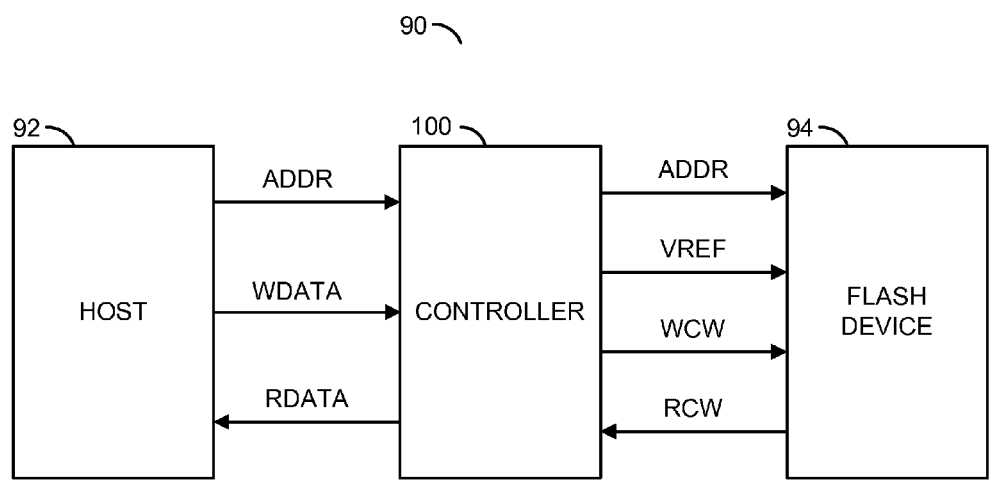
FIG. 1 is a block diagram of an example apparatus.

Some embodiments of the present invention generally provide nonvolatile (e.g., NAND flash and/or NOR flash) memory read scrub methods that generate additional signals useful for nonvolatile memory channel tracking. Normal read scrubbing may be implemented for nonvolatile memory devices as a precaution against uncorrectable errors. Generating the additional signals for the channel tracking results may represent minimal additional cost and/or performance penalties while reducing read error rates.

For nonvolatile memories, such as NAND flash memory, errors may accumulate over time. The read (or memory) scrubbing of the nonvolatile memories may be used as a precaution against the uncorrectable errors. However, nonvolatile memory read scrubbing generally has differences from common memory scrubbing in DRAM or SRAM devices.

The differences include, but are not limited to, one or more of the following features. A decision about whether an error correction coded (e.g., ECC) unit being scrubbed is a candidate for rewriting may be based on one or more of the following criteria. Precise error rates vs. just having any errors—a limited number of errors may be acceptable with nonvolatile memory read scrubbing. Other nonvolatile memory-specific criteria, such as an amount of reference voltage drift that has occurred, may be considered.

Channel statistics for one or more given pages may be updated so that non-scrub reads and/or future scrub reads may be performed more efficiently. Updating the channel statistics may be performed with the nonvolatile memory read scrubs, but SRAM/DRAM devices do not adjust channel parameters for future reads.

The read scrubbing may be used to update other statistics such as read disturb count (e.g., RDC) and block error statistics (e.g., BES). The RDC and BES statistics generally prevent "hidden" pages from accumulating too many errors when neighboring memory cells are accessed. The RDC and BES statistics are generally unique to nonvolatile memories and so such statistics may be maintained for every read, including the scrub reads. Furthermore, the scrub reads may ensure that the statistics cover all locations within the memory, not just the locations that the host reads.

NAND flash-type nonvolatile memory generally stores information in each memory cell by representing one or more bits with a charge on the floating gate, exhibited as the threshold voltage (e.g., Vt). The bits may be read out of the memory cells by applying one or more reference voltages (e.g., Vref) to a control gate and sensing whether the transistor is turned on or off. From a memory controller point of view, knowledge of the statistical distributions of the threshold voltages Vt within a nonvolatile memory channel comprising a group of memory cells (e.g., a word line, a block, a die, etc.) may enable tuning of one or more parameters such as Vref, decoder settings and the like. The tuning may be performed regardless of whether a hard decision decoding ECC or soft decision decoding ECC is implemented.

The memory channel parameters may change with many factors, such as program/erase (e.g., P/E) cycling, retention, read disturb, and the like. Tracking the channel parameters typically utilizes some reads on the group of memory cells. The tracking may be divided into two classes: online and offline. The online channel tracking may utilize host reads and/or maintenance reads for other purposes, with no dedicated reads. The offline channel tracking may utilize the dedicated reads which generally involves reading the same groups of cells at different reference voltages.

Referring to FIG. 1, a block diagram of an example apparatus 90 is shown. The apparatus (or circuit or device or integrated circuit) 90 may implement a computer having a nonvolatile memory circuit. The apparatus 90 generally comprises a block (or circuit) 92, a block (or circuit) 94 and a block (or circuit) 100. The circuits 92 to 100 may represent modules and/or blocks that may be implemented as hardware, software, a combination of hardware and software, or other implementations.

A signal (e.g., ADDR) may be generated by the circuit 92 and received by the circuits 94 and 100. The signal ADDR may implement an address signal used to access data in the circuit 94. A signal (e.g., VREF) may be generated by the circuit 100 and presented to the circuit 94. The signal VREF may convey and/or specify a reference voltage used by the circuit 94 to read data. A signal WDATA may be generated by the circuit 92 and presented to the circuit 100. The signal WDATA generally conveys write data to be written into the circuit 100. A signal (e.g., WCW) may be generated by the circuit 100 and transferred to the circuit 94. The signal WCW may carry error correction coded (e.g., ECC) write codewords written into the circuit 94. A signal (e.g., RCW) may be generated by the circuit 94 and received by the circuit 100. The signal ROW may carry ECC codewords read from the circuit 94. A signal (e.g., RDATA) may be generated by the circuit 100 and presented to the circuit 92. The signal RDATA may carry error corrected versions of the data in the signal RCW.

The circuit 92 may implement a host circuit. The circuit 92 is generally operational to read and write data to and from the circuit 94. When reading or writing, the circuit 92 may place an address value in the signal ADDR to identify which set of data is to be written or to be read from the circuit 94. The write data may be presented in the signal WDATA The read data requested by the circuit 92 may be received via the signal RDATA.

The circuit 94 may implement a nonvolatile memory circuit. In some embodiments, the circuit 94 may be a NAND flash device. In other embodiments, the circuit 94 may be implemented as all or a portion of a solid state drive having one or more nonvolatile devices. The circuit 94 is generally operational to store data in a nonvolatile condition. When data is read from the circuit 94, the circuit 94 may access a set of data (e.g., multiple bits) identified in the signal ADDR. An exhibited threshold voltage of each memory cell within the accessed set may be compared with the reference voltage specified in the signal VREF. For each memory cell where the reference voltage is above the threshold voltage, one or more logical values may be sensed. For each memory cell where the reference voltage is below the threshold voltage, one or more different logical values may be sensed.

In some embodiments, the circuit 94 may be implemented as a single-level cell (e.g., SLC) type circuit. An SLC type circuit generally stores a single bit per memory cell (e.g., a logical 0 or 1). In other embodiments, the circuit 94 may be implemented as a multi-level cell (e.g., MLC) type circuit. An MLC type circuit is generally capable of storing multiple (e.g., two) bits per memory cell (e.g., logical 00, 01, 10 or 11). In still other embodiments, the circuit 94 may implement a triple-level cell (e.g., TLC) type circuit. A TLC circuit may be able to store multiple (e.g., three) bits per memory cell (e.g., a logical 000, 001, 010, 011, 100, 101, 110 or 111).

The signal ADDR generally spans an address range of the circuit 94. The address range may be divided into multiple groups. Each group may be divided into one or more sets of data. Each set of data generally incorporates multiple memory cells. The signal WCW may write an entire set (or ECC codeword) into the circuit 94. The signal RCW may read an entire set (or ECC codeword) from the circuit 94.

In various embodiments, one or more types of nonvolatile storage devices may be used to implement the circuit 94. Such nonvolatile devices include, but are not limited to, SLC NAND flash memory, MLC NAND flash memory, NOR flash memory, flash memory using polysilicon or silicon nitride technology-based charge storage cells, two-dimensional or three-dimensional technology-based flash memory, ferromagnetic memory, phase-change memory, racetrack memory, resistive random access memory, magnetic random access memory and similar types of memory devices and/or storage media.

The circuit 100 may implement a controller circuit. The circuit 100 is generally operational to control reading to and writing from the circuit 94. The circuit 100 may be implemented as one or more integrated circuits (or chips or die) in any controller used for controlling one or more solid state drives (e.g., SSD), embedded storage, or other suitable control applications.

In various embodiments, as part of a read access to the circuit 94, the circuit 100 may specify and/or generate the reference voltage in the signal VREF. The reference voltage may be adjusted based on channel parameters (or read parameters) of the circuit 94 to minimize a read error rate. Adjustments of the channel parameters may be performed based on each "online" read. An online read generally means that the read takes place because the circuit 92 has requested the read data and/or the circuit 100 is performing maintenance on the circuit 94. An "offline" read may be considered a read used to measure and/or update the channel parameters (e.g., no data is presented to the circuit 92) and generally involves reading the same group of cells multiple times with different reference voltages.

The circuit 100 may also include an error correction coding (e.g., ECC) capability and an error detection and correction (e.g., EDC) capability. The error correction coding may be used to add additional bits to sets of data received in the signal WDATA. The extra bits generally enable the detection and ultimate correction of one or more bits that may become corrupted between a write and one or more subsequent reads. The ECC data (e.g., the original data plus the extra bits) may be presented in the signal WCW.

The error detection and correction capability may provide an ability to detect when one or more bits in the signal RCW have been corrupted (e.g., flipped). The error detection and correction capability may also correct a limited number of the corrupted bits. The corrected data may be presented in the signal RDATA. The error detection and correction feature may also generate statistics concerning read error rates experienced in the raw read data received in the signal RCW.

The circuit 100 may include a bit scrambling capability and a bit descrambling capability. The scrambling, such as by encryption, may alter a number of logical one bits and a number of logical zero bits in each set such that the two numbers are approximately the same. The descrambling, such as by decryption, may undo the scrambling to restore the data to an original form. Additional details of the circuit 100 may be found in co-pending U.S. application Ser. No. 13/555,444, hereby incorporated by reference in its entirety.

Figure 2:
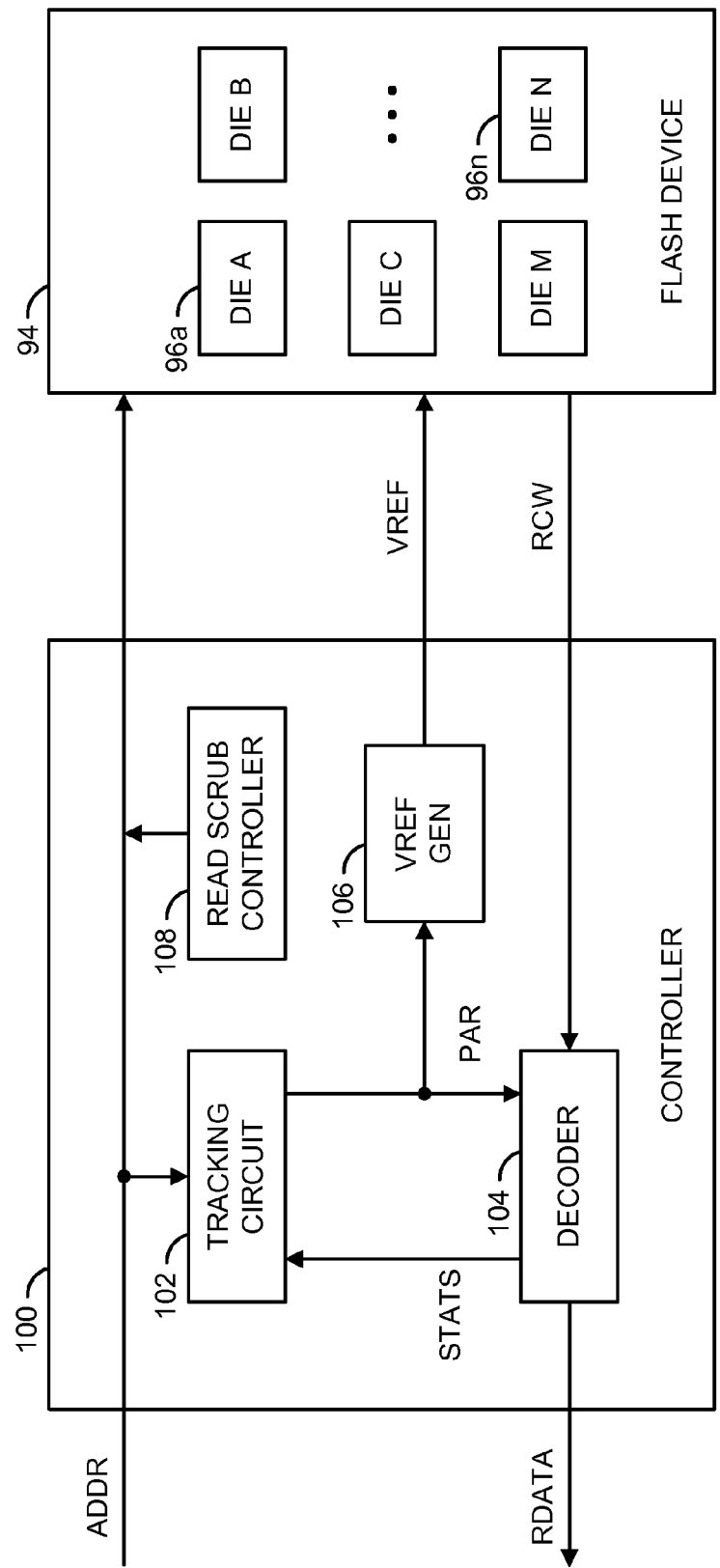
FIG. 2 is a block diagram of an example implementation of a controller in the apparatus in accordance with a preferred embodiment of the present invention.

Referring to FIG. 2, a block diagram of an example implementation of the circuit 100 is shown in accordance with a preferred embodiment of the present invention. The circuit 100 generally comprises a block (or circuit) 102, a block (or circuit) 104, a block (or circuit) 106 and a block (or circuit) 108. The circuit 94 may comprise multiple blocks (or circuits) 96a-96n. The circuits 96a to 108 may represent modules and/or blocks that may be implemented as hardware, software, a combination of hardware and software, or other implementations.

The signal ADDR may be received by the circuits 94 and 102. The signal VREF may be generated by the circuit 106. The signal RCW may be received by the circuit 104. The circuit 104 may generate the signal RDATA. A signal (e.g., STATS) may be generated by the circuit 104 and transferred to the circuit 102. The signal STATS may convey one or more pieces of status information concerning a decode of the ECC codewords received in the signal RCW and one or more statistics of the signal RCW. The circuit 102 may generate a signal (e.g., PAR) received by the circuit 106, and optionally received by the circuit 104. The signal PAR may carry multiple parameters that characterize the read channel (e.g., NAND flash channel) properties of the circuit 94. The circuit 108 may also generate the signal ADDR as part of read scrub operations.

Each circuit 96a-96n may implement a nonvolatile memory device. In some embodiments, each circuit 96a-96n may be fabricated as an individual die (or chip). Each circuit 96a-96n generally comprises multiple memory cells.

Each memory cell may store a single bit (in SLC type memory) or multiple bits (in MLC, TLC and/or other higher multi-bit type memories). Multiple bits are generally grouped into pages, word lines, blocks or the like. In some embodiments, a single group may span an entire circuit 96a-96n. Due to noise, the actual threshold voltage of each memory cell may be different. Therefore, the expressed threshold voltages of each group of memory cells generally form a distribution. Each distribution of the threshold voltages may be defined by the channel parameters (e.g., a mean threshold voltage $\mu$ and a standard deviation a from the mean threshold voltage). The different channels may be treated independently of each other, depending on a tracking granularity. For example, different blocks in the same nonvolatile memory die (e.g., circuit 96a) may exhibit different channel parameters (e.g., different threshold voltage distributions).

The circuit 102 may implement a tracking circuit. The circuit 102 is generally operational to track and update the read channel (e.g., memory channel) parameters (or properties) in response to an error correction applied to a set of data read from the circuit 94. In some embodiments, the channel parameters may be tracked separately for each group of memory cells. For MLC, TLC and/or other multi-bit type memories having four of more states per memory cell, the circuit 102 may also be configured to extrapolate the channel parameters corresponding to the outer states based on changes in the parameters corresponding to the middle two states. The channel parameters for the group containing the current set of memory cells being read may be presented in the signal PAR.

The circuit 104 may implement a decoder circuit. The circuit 104 is generally operational to decode (or error detect and correct) each set of data received in the signal RCW. The corrected data may be presented in the signal RDATA. The statistics may be gathered before and/or during the correction by the circuit 104. The statistics generally include, but are not limited to, one or more of a total number of zero data bits in the scrambled data received from the circuit 94, a total number of one bits in the scrambled data received from the circuit 94, a total number of zero data bits in the corrected set, a total number of one data bits in the corrected set, a total number of bits corrected from zero to one, a total number of bits corrected from one to zero, other statistics, and any function and/or combination thereof. The statistics may be presented in the signal STATS.

To counteract noise, the data stored in the circuit 94 is usually error correction coded. Decoding is generally performed by the circuit 104 when reading the ECC data from the circuit 94. In some embodiments, ECC encoding is paired with hard-decision decoders, such as Bose, Ray-Chaudhuri and Hocquenghem (e.g., BCH) decoders and hard-decision Reed-Solomon decoders. In some embodiments, soft decision decoders, such as Viterbi decoders for convolutional codes and soft decoders for low density parity check (e.g., LDPC) codes may be implemented in the circuit 104.

The circuit 106 may be implemented as a reference voltage circuit. The circuit 106 is generally operational to specify or generate a variable reference voltage used by the circuit 94 in reading a set of data from the circuit 94. The circuit 106 may also be operational to adjust the reference voltage via the signal VREF based on one or more updated channel parameters received from the circuit 102 in the signal PAR. For example, the circuit 106 may adjust the reference voltage higher or lower to track a shift in a mean threshold voltage of a group. Adjusting the reference voltage generally lowers an error rate in subsequent reads from the circuit 94.

The circuit 108 may implement a read scrub controller circuit. The circuit 108 is generally operational to initiate read scrub operations on the circuit 94. The circuit 108 may determine a frequency and/or a sequence of the read scrubs, and issue reads of certain pages in the circuit 94 when a (background) read scrub is initiated. The pages being scrubbed may be identified by the address values presented in the signal ADDR. The circuit 108 may also be operational to determine what to do if the ECC decoding of the read scrub data fails or if the ECC decoding succeeds but a significant number of errors were corrected in a codeword (or any other granularity, such as a page, a block, etc.). Each codeword having one or more correctable errors may be corrected by the circuit 104 and subsequently rewritten into the circuit 94.

In some embodiments, the channel parameters may be useful in lowering an overall read error rate. For example, knowledge of the channel parameters may help the circuit 100 to determine a more optimized reference voltage when reading from the circuit 94. Due to retention, the threshold voltage distributions may drift away from the original distributions. Without knowing the drifts, a fixed reference voltage may eventually lead to more read errors, which may exceed the error correction capability of the circuit 104 and therefore lead to read failures.

Knowledge of the channel parameters may also help the circuit 100 determine better decoding parameters. For example, in implementations of the circuit 104 that have an LDPC decoder with a log likelihood ratio (e.g., LLR) type of decoder input, the changes in threshold voltage distributions may result in changes to the LLR computation for the decoder. Without knowing the channel parameters, the LLR computation may become sub-optimal thus leading to poor decoding performance.

Measurements of the channel parameters for each group may be performed online and/or offline. The offline tracking generally utilizes additional reads intended for channel tracking purposes. The online channel tracking generally does not utilize the additional reads. For example, if the circuit 100 is issuing a read due to a read request from the circuit 92, such a read is generally not considered an additional read. If the circuit 100 is issuing a read for maintenance purposes, such as moving a partially written block, such reads are generally not considered additional reads. Because each nonvolatile memory read involves performance hits in latency/throughput/power, the online channel tracking may have a higher performance than the offline channel tracking.

The offline measurements may be a straightforward way of determining the threshold voltage distributions of each group. Directly measuring the threshold voltage distributions generally involves many reads on each group of memory cells, because the circuit 100 generally supports hard-decision reads. If the circuit provides direct soft reads through an analog-to-digital converter (e.g., ADC), some channel tracking may be capable, although possibly limited due to the finite precision of the ADC. The online channel tracking is generally achieved with fewer reads than the offline tracking.

Figure 3:
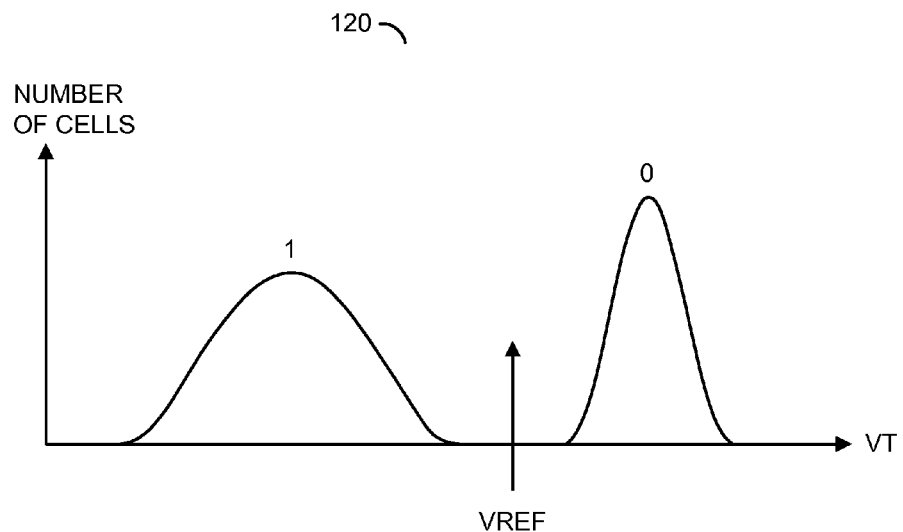
FIG. 3 is a graph of example single-level cell threshold voltage distributions.

Referring to FIG. 3, a graph of example SLC threshold voltage distributions 120 is shown. If m bits are stored in a memory cell, the cell generally has $2^m$ levels of threshold voltages corresponding to $2^m$ possible states. Each state may be mapped to an m-bit symbol. For SLC types of memory cells, m=1. For MLC types of memory cells, m=2. For TLC types of memory cells, m=3, and so on. Due to various noises, the expressed threshold voltage of each state may be a random variable (e.g., RV) rather than a fixed value. The distribution of the threshold voltages may be mathematically modeled in many possible ways. To make online tracking simple and feasible, the threshold voltages may be modeled as a random variable with a Gaussian distribution having a mean threshold voltage (e.g., $\mu$) and a standard deviation (e.g., $\sigma$). Therefore, a probability distribution function for a state may be referred to as $N(\mu, \sigma^2)$. For example, the two states "1" and "0" may follow distributions $N(\mu1, \sigma1^2)$ and $N(\mu2, \sigma2^2)$, respectively. A "distance" (e.g., D) between the peaks of the two states is generally defined as $D=|\mu1-\mu2|$.

A motivation for the online channel tracking may be to track the threshold voltage distribution parameters as the nonvolatile memory device deteriorates by utilizing normal reads issued for other purpose (e.g., host read or read scrub). The normal reads may be considered hard-decision reads processed by the circuit 104. If the decoding is successful, the decoding statistics may be extracted to help track the channel parameters.

Figure 4:
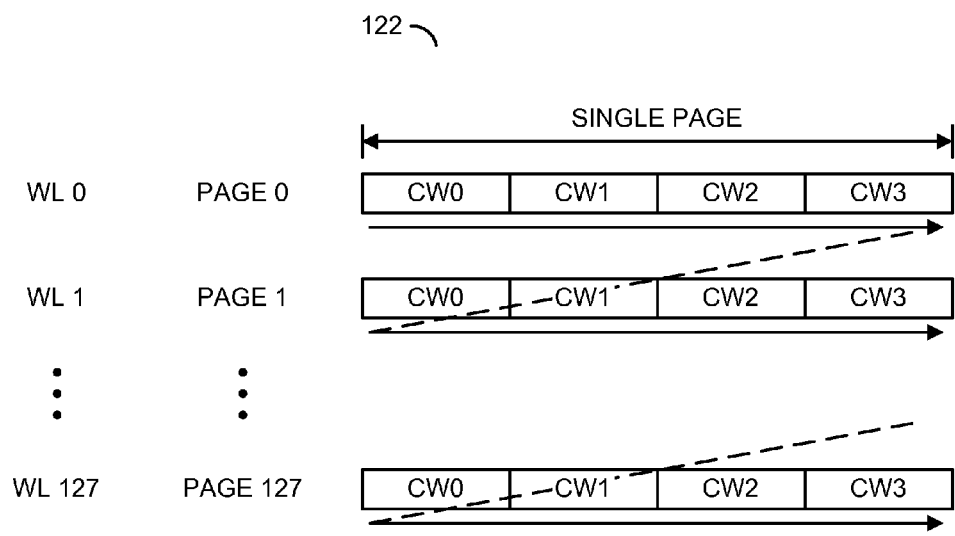
FIG. 4 is a diagram of an example implementation of a page order read scrub of a block.

Referring to FIG. 4, a diagram of an example implementation of a page order read scrub 122 of a block is shown. In the example, each word line (e.g., WL 0-WL 127) may contain a single page (e.g., pages 0-127). Each page may contain multiple (e.g., 4) codewords (e.g., CW0-CW3). The read scrub 122 generally uses a single reference voltage (e.g., voltage VREF in FIG. 3).

The online channel tracking may be done with statistics obtained during the read scrub 122 for each page. In the example, a read scrub 122 may be performed simply from a first page (e.g., page 0) to a last page (e.g., page 127) in the block. All of the multiple ECC codewords in each page (a page or multi-plane page) may be read and decoded during the read scrub.

The circuit 102 may implement any suitable online tracking method (or process) based on the statistics in the signal STATS. For example, zero bit/one bit (e.g., 0/1) disparity statistics before decoding may be collected in each read scrub. During a read scrub, the 0/1 disparity of all codewords in a single page may be accumulated to calculate the disparity of the entire page. The resulting disparity may be sent to the circuit 102 in the signal STATS as a page-level disparity. Since only accumulation of statistics are collected, the circuit 104 may not implement a read scrub buffer to store scrambled and/or decoded data. Additional details for collecting the 0/1 disparity information may be found in co-pending U.S. application Ser. No. 13/464,433 filed May 4, 2012, which is hereby incorporated by reference in its entirety.

Figure 5:
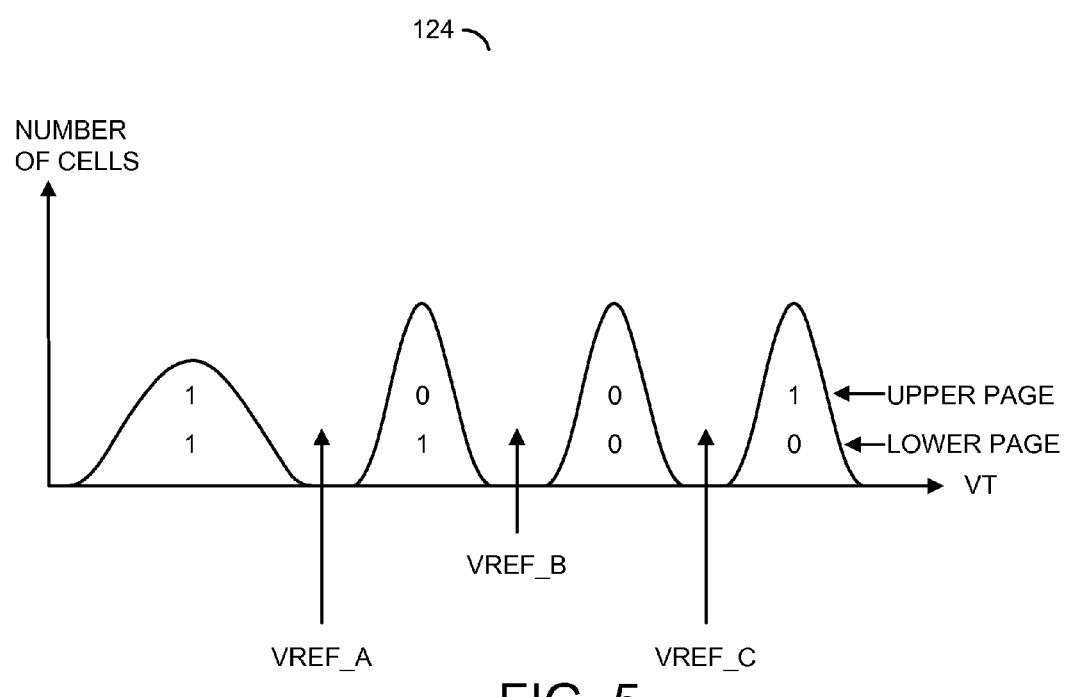
FIG. 5 is a graph of example multi-level cell threshold voltage distributions.

Referring to FIG. 5, a graph of example MLC threshold voltage distributions 124 is shown. The channel tracking during read scrub technique may be useful for the MLC type devices and other devices with more than one bit per cell, such as the TLC type devices. In an MLC device, each memory cell generally stores multiple (e.g., 2) bits and utilizes more than 2 (e.g., 4) Vt levels. In some nonvolatile memories, gray mapping may be used to map the bit values to the Vt levels. The multiple bits in each memory cell generally reside in multiple (e.g., 2) pages: a lower page and an upper page. For online channel tracking purposes, read scrub on the lower page may provide useful statistics about the center reference voltage (e.g., voltage VREF_B). However, for an upper page read, typical directional statistics used in online tracking such as the 0/1 disparity and directional correction count may not be as simple. For example, bit flips (e.g., 0→1 and 1→0) may be corrected in opposite directions about voltage VREF_A as compared with voltage VREC_C.

To solve the opposite direction problem for MLC online tracking, a read scrub buffer may be implemented in the circuit 104 to temporarily store the decoded lower page in the same word line as the upper page. With the lower page known, the circuit 104 may be able to synthesize statistics based on both the upper page read results and the lower page read results, either before or after decoding or both.

Figure 6:
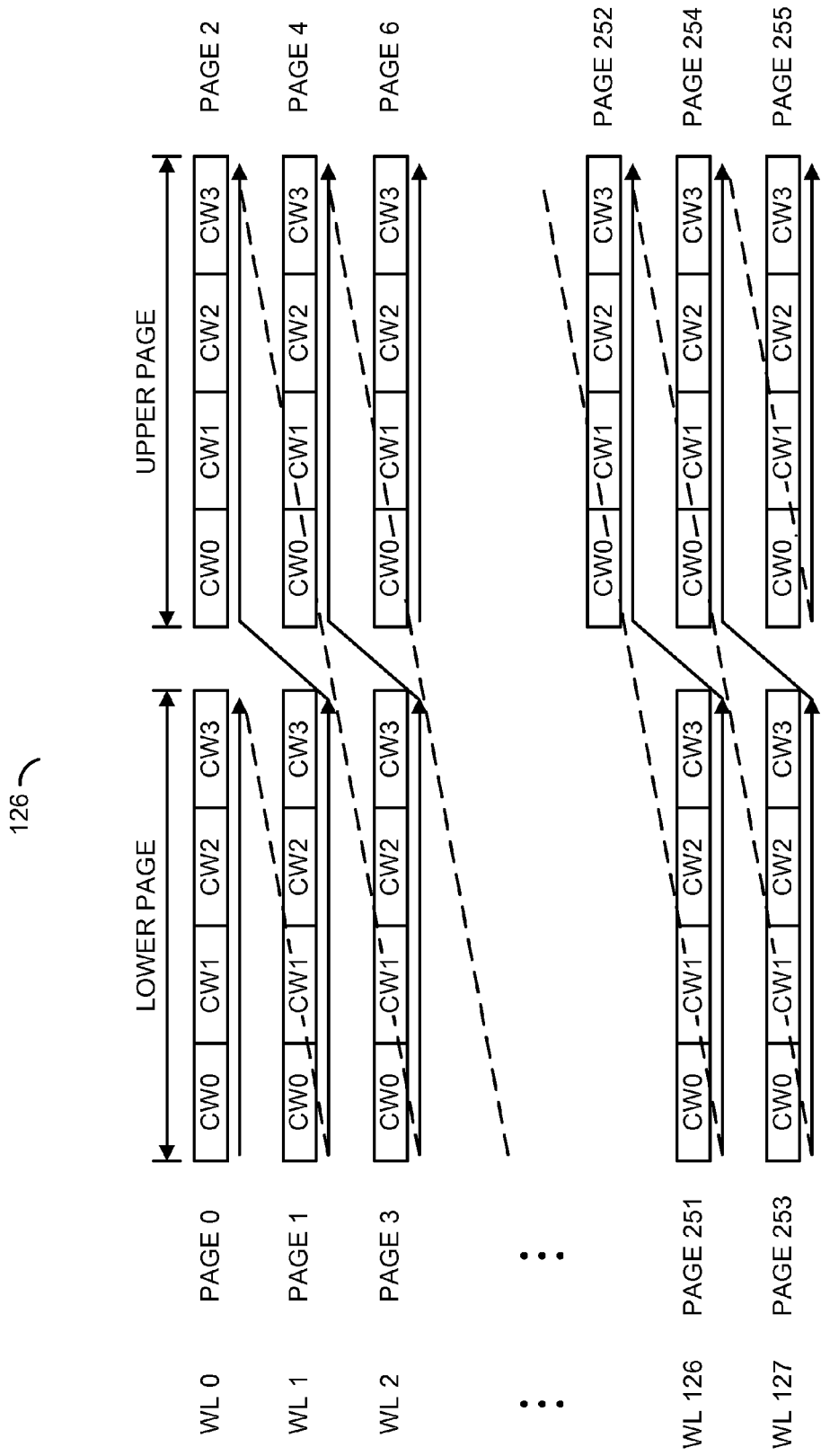
FIG. 6 is a diagram of an example multi-level cell page order read scrub.

Referring to FIG. 6, a diagram of an example MLC page order read scrub 126 is shown. In the example, the MLC device may have 256 pages per block (e.g., 128 word lines per block with 2 pages per word line). The read scrub 126 may read all pages in the block sequentially from page 0 to page 255 (e.g., page 0, 1, 2, 3, . . . , 254, 255). To reduce program interference, nonvolatile memory manufacturers typically use an "interleaved" page order during programming. Therefore, the page order in the read scrub 126 may be the same as the page order used in programming. In the example, a maximum difference between the two pages in the same word line is three pages (e.g., 4-1=3, 6-3=3, 254-251=3). Therefore, the read scrub buffer is generally provisioned to have a minimum size of three pages. If each page has a size of several kilobytes (e.g., 8 KB), the read buffer may have a minimum size three times larger (e.g., 24 KB).

Figure 7:
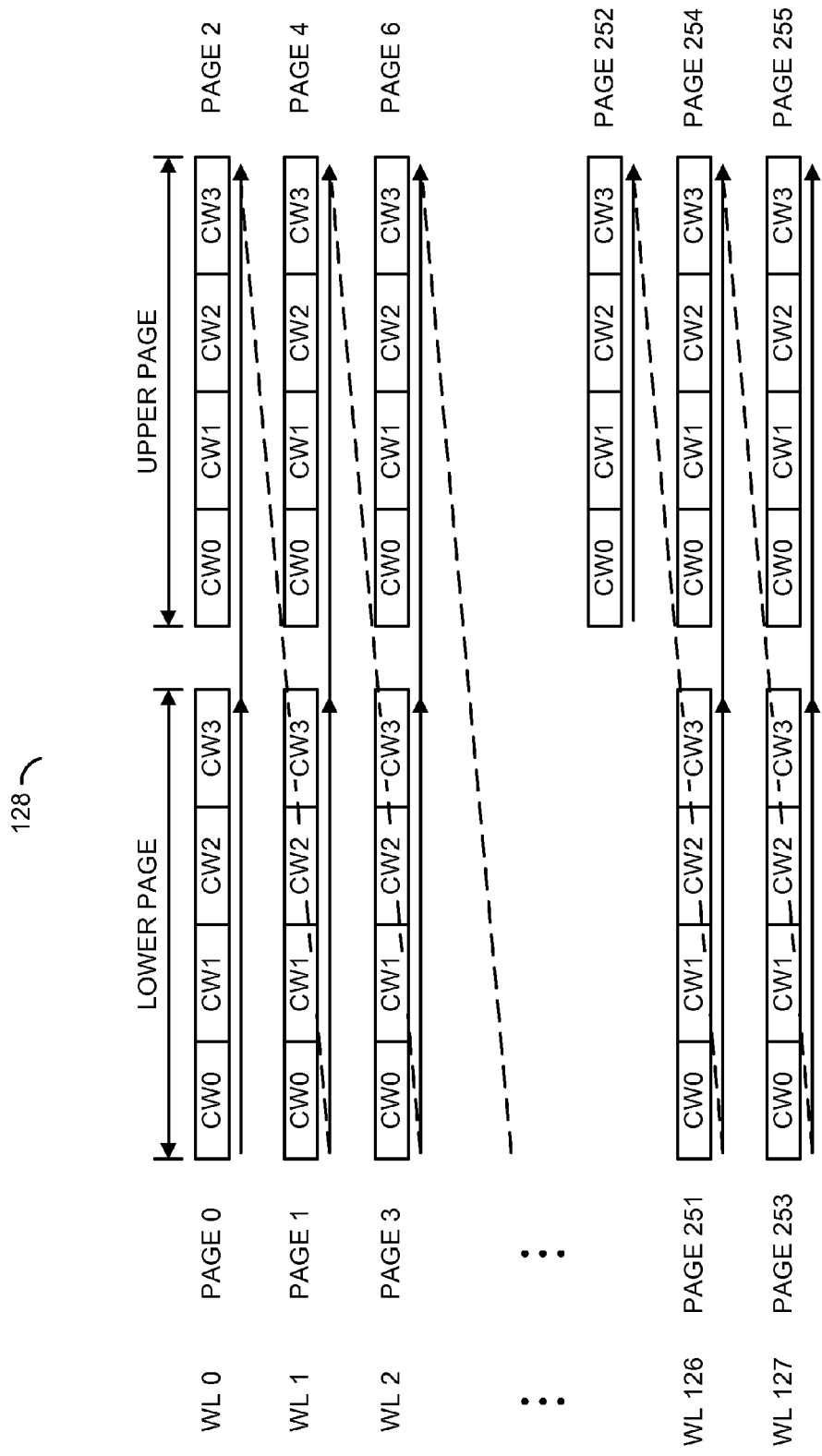
FIG. 7 is a diagram of another example multi-level cell page order read scrub.

Referring to FIG. 7, a diagram of another example MLC page order read scrub 128 is shown. In the example, the MLC device may also have 256 pages per block (e.g., 128 word lines per block with 2 pages per word line). The read scrub 128 may read all wordlines in the block sequentially from wordline 0 to wordline 127 (e.g., wordline 0, 1, 2, 3, . . . , 127). Therefore, the pages may be read in a non-sequential order (e.g., page 0, 2, 1, 4, 3, 6, . . . , 252, 251, 254, 253, 255). The example read scrub 128 changes the page order so that a lower page and a corresponding upper page in the same word line may be read consecutively. The resulting read page order is typically different from the program order.

Because each upper page is read immediately after the corresponding lower page from the same wordline in the read scrub 128, the read scrub buffer in the circuit 104 may have a minimum size (or capacity) sufficient to hold a single page. Furthermore, the read scrub orders may be easily extended to TLC type devices using a minimum read scrub buffer size of two pages.

Figure 8:
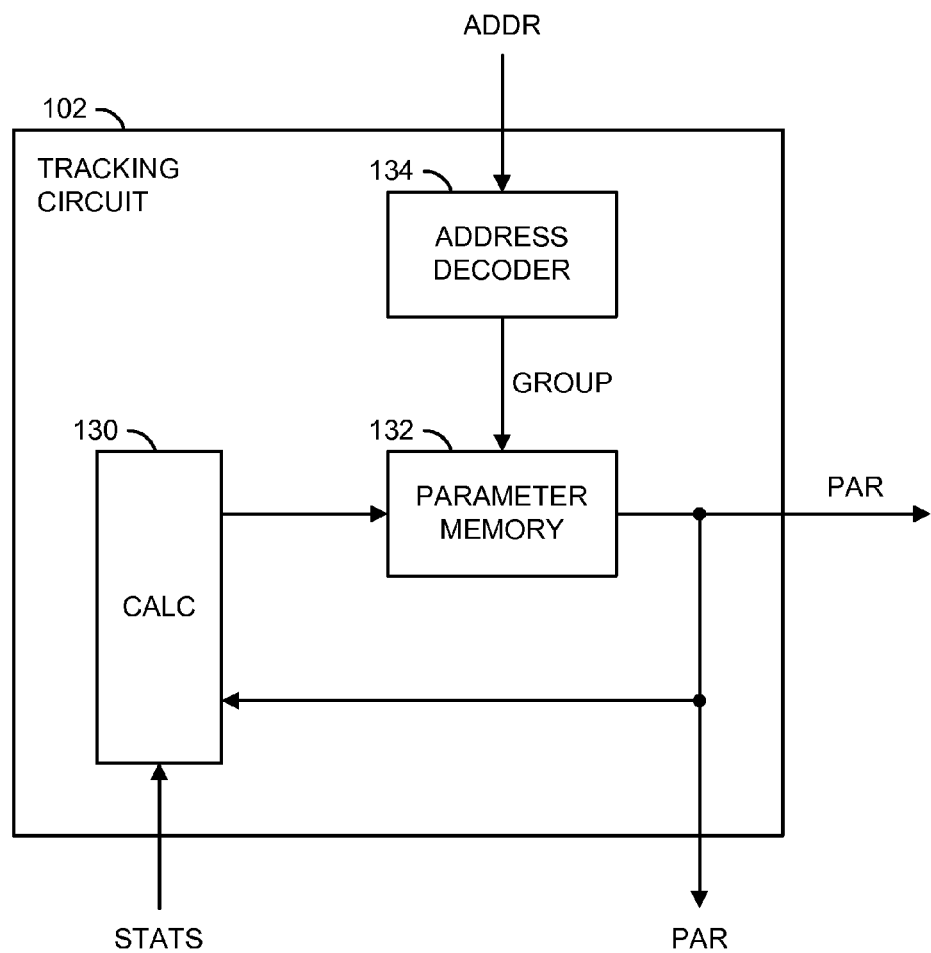
FIG. 8 is a block diagram of an example implementation of a channel tracking circuit in the controller.

Referring to FIG. 8, a block diagram of an example implementation of the circuit 102 is shown. The circuit 102 generally comprises a block (or circuit) 130, a block (or circuit) 132 and a block (or circuit) 134. The circuits 130 to 134 may represent modules and/or blocks that may be implemented as hardware, software, a combination of hardware and software, or other implementations.

The signal ADDR may be received by the circuit 134. The signal STATS may be received by the circuit 130. The signal PAR may be generated by the circuit 132 and received by the circuit 130. A signal (e.g., GROUP) may be generated by the circuit 134 and received by the circuit 132. The signal GROUP may identify which particular group in the circuit 94 is being accessed.

The circuit 130 may implement a calculation circuit. The circuit 130 is generally operational to update the channel parameters based on the statistics received in the signal STATS and the current channel parameters received in the signal PAR. The updated channel parameters may be transferred to the circuit 132.

The circuit 132 may implement a parameter memory circuit. The circuit 132 is generally operational to store the channel parameters for each group. The current parameters for the current group (identified in the signal GROUP) may be read and presented in the signal PAR. Updated parameters for the current group received from the circuit 130 may be stored. In some embodiments, the channel parameters may be copied from time to time to the circuit 94 for nonvolatile storage while power is removed. When power is returned, the channel parameters may be copied from the circuit 94 back to the circuit 132.

The circuit 134 may implement an address decoder circuit. The circuit 134 is generally operational to decode the address value received in the signal ADDR into a particular group within the circuit 94. A decoded group value (or identification) may be transferred to the circuit 132 in the signal GROUP.

The threshold voltage distributions in the SLC type memories may be modeled as shown in FIG. 3. Mean threshold voltages (e.g., $\mu 1$ and $\mu 2$) and standard deviations (e.g., $\sigma 1$ and $\sigma 2$) of the two states (e.g., state "0" and state "w1") in the SLC case may be updated by the circuit 130. The updated parameters (e.g., $\sigma'$ and X) may be treated as linear functions of $$\frac{e_{01}}{n_0} \text{ and}$$
$$\frac{e_{10}}{n_1},$$

where $e_{01}$ may represent a number of zero-to-one (e.g., 0→1) corrected errors, $e_{10}$ may represent a number of one-to-zero (e.g., 1→0) corrected errors, $n_1$ may be a true number of zero bits and $n_1$ may be a true number of one bits. Therefore, given that the circuit 102 already knows the original channel parameters (e.g., $\mu 1$, $\mu 2$, $\sigma 1$ and $\sigma 2$), several coefficients (e.g., A, B and C) may be pre-computed by the circuit 102, and the channel tracking method is generally defined by equation set 1 as follows:

$$\begin{cases} \sigma' \approx \sigma + A \cdot \left(\frac{e_{01}}{n_0} + \frac{e_{10}}{n_1} - B\right), \\ x \approx C \cdot \left(\frac{e_{01}}{n_0} - \frac{e_{10}}{n_1}\right), \end{cases} \quad (1)$$

where $\sigma'$ (e.g., $\sigma'1$ and $\sigma'2$) may represent an updated standard deviation and X may represent a shift in the mean voltages.

In the MLC case, while decoding a lower page codeword, the circuit 104 may not be able to exactly count the number of cells in the state "01" and cells in the state "00". If a good (or complete) randomization is used, the number of memory cells in each state may be considered the same (e.g., n). Therefore, the channel parameters may be updated by equation set 2 as follows:

$$\begin{cases} \sigma' = \frac{\mu_{00} - \mu_{01}}{Q^{-1}\left(\frac{e_{10}}{n}\right) + Q^{-1}\left(\frac{e_{01}}{n}\right)}, \\ x = \left[\frac{1}{2}(\mu_{01} + \mu_{00}) - Vref\right] + (\mu_{00} - \mu_{01}) \cdot \frac{Q^{-1}\left(\frac{e_{10}}{n}\right) - Q^{-1}\left(\frac{e_{01}}{n}\right)}{Q^{-1}\left(\frac{e_{10}}{n}\right) + Q^{-1}\left(\frac{e_{01}}{n}\right)}. \end{cases} \quad (2)$$

Although the states "11" and "10" may not be directly tracked in some embodiments, an extrapolation method may be applied to estimate the channel parameters for the states "11" and "10". For example, an estimate of the drift for state "10" may be $X_{10} = \alpha X$, where $$\alpha = \frac{\mu_{10} - c_0}{\mu_{00} - c_0}.$$

A good (or complete) randomization may also be applied to MLC devices and TLC devices. In particular, equation set 1 may be used, where $n_0=n_1=n$. After the channel parameters for states "01" and "00" are estimated, the channel parameters may be tracked for the other two states.

Figure 9:
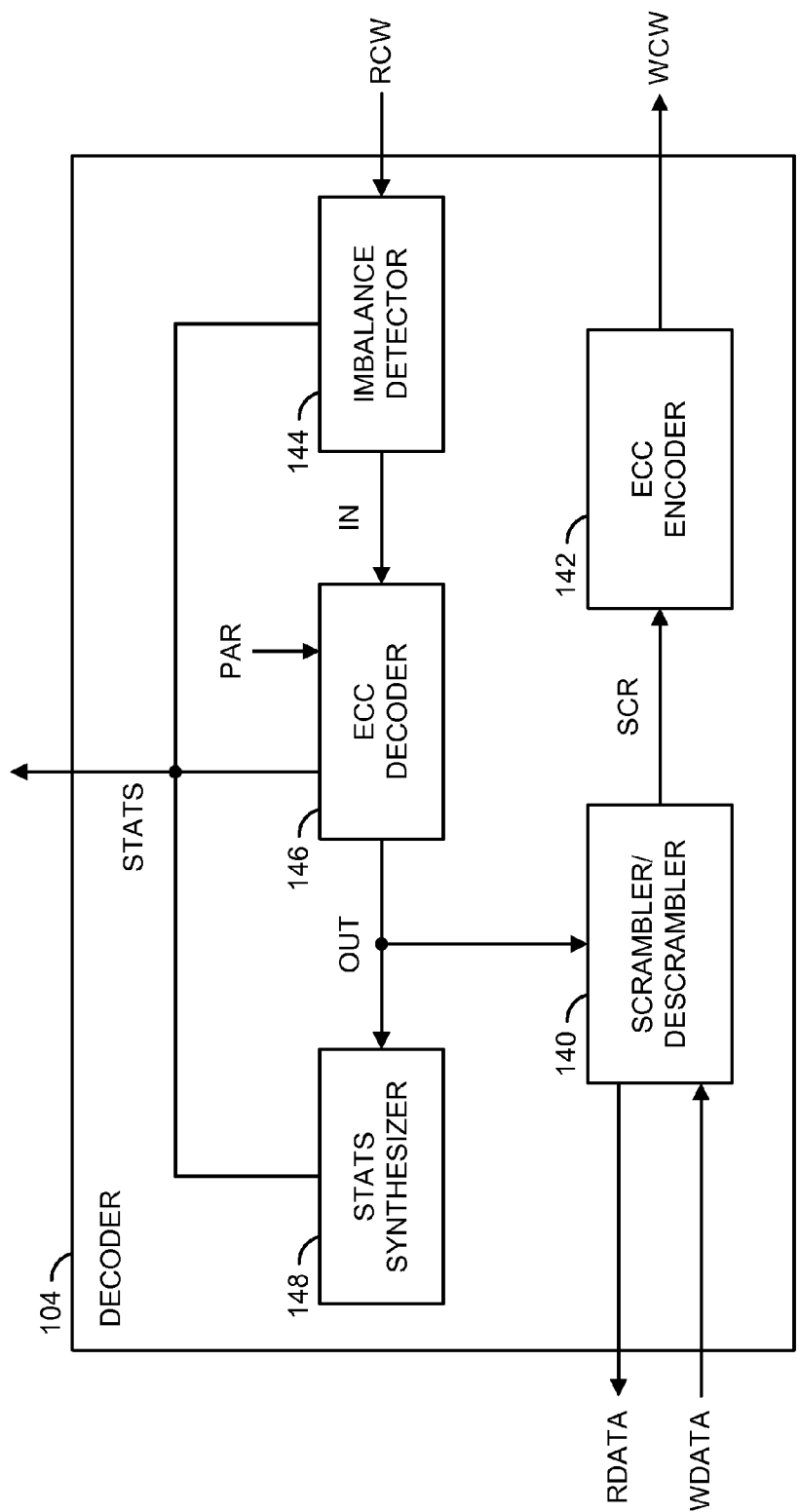
FIG. 9 is a block diagram of an example implementation of a decoder in the controller.

Referring to FIG. 9, a block diagram of an example implementation of the circuit 104 is shown. The circuit 104 generally comprises a block (or circuit) 140, a block (or circuit) 142, a block (or circuit) 144, a block (or circuit) 146 and a block (or circuit) 148. The circuits 140 to 148 may represent modules and/or blocks that may be implemented as hardware, software, a combination of hardware and software, or other implementations.

The circuit 140 may receive the signal WDATA. The signal RDATA and a signal (e.g., SCR) may be generated and presented by the circuit 140. The circuit 142 may receive the signal SCR. The signal SCR generally carries scrambled data. The signal WCW may be generated by the circuit 142. The circuit 144 may receive the signal RCW. A signal (e.g., IN) may be generated by the circuit 144 and transferred to the circuit 146. The signal IN may implement an input signal that carries the scrambled (raw) ECC data read from the circuit 94. The circuit 146 may generate a signal (e.g., OUT) received by the circuits 140 and 148. The signal OUT may carry the corrected data generated by an error correction of the scrambled data of the signal IN. The signal PAR may be received by the circuit 146. The signal STATS may be generated by a combination of the circuit 144, 146 and 148.

The circuit 140 may implement a scrambler/descrambler circuit. The circuit 140 generally operates on (scrambles) the write data received in the signal WDATA to generate scrambled write data in the signal SCR. The data may be scrambled in a reversible manner such that the scrambled data has a known statistical distribution of storage states. An example of a block comprising scrambled data is a block containing similar numbers of zero bits and one bit values and a 4-level MLC block comprising scrambled data containing similar numbers of "00", "01", "10", and "11" states. In some embodiments, circuit 140 may perform encryption (e.g., an Advanced Encryption Standard cipher) that randomizes the data as a by-product of the encryption. In some embodiments, circuit 140 may include a linear feedback shift register configured to randomize the data.

The circuit 140 may also be operational to descramble the error corrected read data received in the signal OUT. The descrambling generally reverses the scrambling performed on the write data. The descrambled data may be presented in the signal RDATA. The circuit 140 may also include a decryption capability to reverse any encryption performed on the write data.

The circuit 142 may implement an ECC encoder circuit. The circuit 142 is generally operational to error correction encode the scrambled data received in the signal SCR using an ECC encoding technique. The ECC scrambled data may be presented in the signal WCW to the circuit 94.

The circuit 144 may implement an imbalance detector circuit. The circuit 144 is generally operational to monitor the read data received from the circuit 94 and at least temporarily maintains data on the statistical distributions of states. The statistical distributions may be presented as part of the signal STATS.

The circuit 146 generally implements an ECC decoder circuit. The circuit 146 may be operational to process the read data units received in the signal IN. The processing generally exploits the included additional ECC bits to correct any errors that may have arisen at any point and time since the data was initially ECC encoded. The resulting error corrected data may be presented in the signal OUT to the circuits 140 and 148. The number of zero-to-one and one-to-zero bit flips corrected by the circuit 146 may be presented as part of the signal STATS.

The circuit 148 may implement a statistics synthesizer circuit. The circuit 148 is generally operational to synthesize (or calculate) the zero-to-one and one-to-zero corrections of non-lower pages read from MLC and/or TLC type memories. For an MLC type memory, the statistics may be calculated based only on (i) a lower page that has been error corrected, (ii) a current page that has been error corrected and (iii) the current page as received (or read) from the memory circuit. The synthesized statistics may be presented to the circuit 102 as part of the signal STATS.

Figure 10:
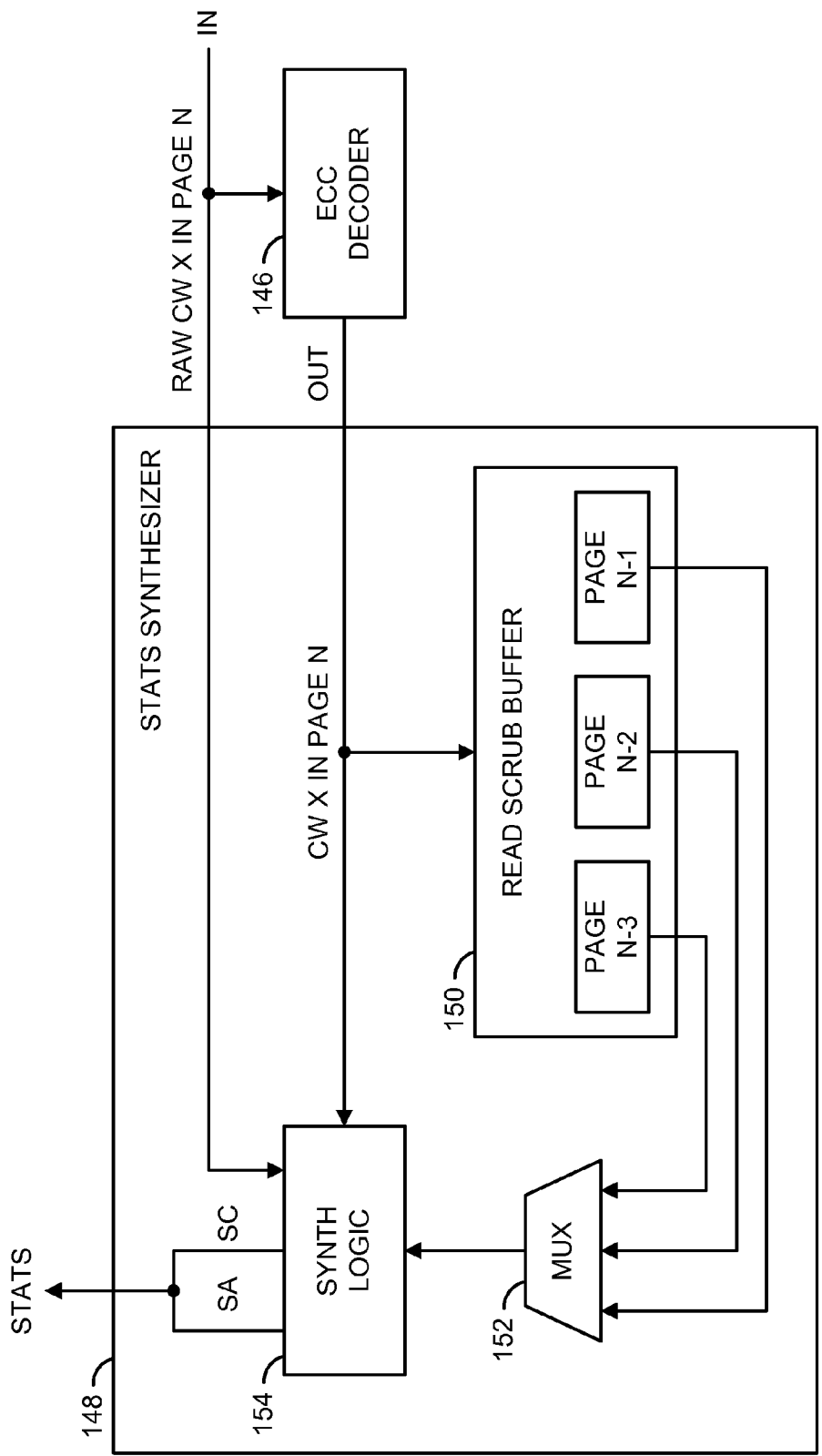
FIG. 10 is a block diagram of an example implementation of a statistics synthesizer in the decoder.

Referring to FIG. 10, a block diagram of an example implementation of the circuit 148 is shown. The circuit 148 generally comprises a block (or circuit) 150, a block (or circuit) 152 and a block (or circuit) 154. The circuits 150 to 154 may represent modules and/or blocks that may be implemented as hardware, software, a combination of hardware and software, or other implementations.

The signal IN may be received by the circuit 154. The signal OUT may be received by the circuits 150 and 154. A signal (e.g., SA) may be generated by the circuit 154. The signal SA generally conveys the zero-to-one and one-to-zero counts for bit flips corrected around the reference voltage VREF_A. A signal (e.g., SC) may be generated by the circuit 154. The signal SC generally conveys the zero-to-one and one-to-zero counts for bit flips corrected around the reference voltage VREF_C. The signals SA and SC may form parts of the signal STATS.

The circuit 150 generally implements a read scrub buffer circuit. The circuit 150 may be operational to temporarily buffer one or more units (e.g., pages) of data previously error corrected by the circuit 146. Each unit stored in the circuit 150 may be presented to a different input of the circuit 152.

The circuit 152 generally implements a multiplexer circuit. The circuit 152 may be operational to multiplex a selected unit stored in the circuit 150 to the circuit 154. The selection is generally based on the order in which the units were read from the circuit 94. For example, where the read order follows that of FIG. 6, the circuit 152 may multiplex one of the three lower pages (e.g., PAGE N-3, PAGE N-2 or PAGE N-1) that corresponds to a current codeword (e.g., CW X) in a current page (e.g., PAGE N). The circuit 154 may implement a synthesis logic circuit.

The circuit 154 is generally operational to calculate (or synthesize) the zero-to-one and one-to-zero counts for bit flips corrected in the upper pages. The counts may be presented in the signals SA and SC.

The read scrub procedure implemented in the circuit 104 may generate three types of statistics: statistics before decoding, statistics after decoding, and synthesized statistics, all of which may be used by the circuit 102 to improve estimations of the threshold voltage distributions. Channel tracking based on a lower page read may be straight forward and similar to the online channel tracking in an SLC device. No ambiguity generally exists in the directional statistics of a lower page.

When decoding an upper page N, the 0-1 directional statistic may mean crossing from "01" to "11" (right-to-left crossovers around voltage VREF_A) or from "00" to "10" (left-to-right crossovers around voltage VREF_C) in FIG. 5. Therefore, previous page reads (preferably decoded pages) may be buffered in the circuit 150 to remove the ambiguity. For the upper page N, the corresponding lower page (e.g., page N-3 if N=4, 6, ..., 254) in the same word line as page N may be selected by the circuit 152. The circuit 154 may subsequently calculate the directional statistics (counts) for both the Vt region around voltage VREF_A and the Vt region around voltage VREF_C using the following three items:

1. Bits in the corresponding lower page may be selected from among the three pages buffered in the circuit 150 based on program order knowledge of the circuit 94.
2. Raw input bits in the current codeword (e.g., CW X) in the page N.
3. A decoded codeword (e.g., CW X) in page N once the circuit 146 converges.

The entire page is generally not used for the raw input bits and the decoded codeword because such bits may be utilized on-the-fly. Implementation of the circuit 154 may have many variations. For example, the circuit 154 may be implemented as a lookup table, such as Table I, as follows:

TABLE I

| Inputs | | | Outputs | | | |
|---|---|---|---|---|---|---|
| Decoded bit in lower page N-3 | Raw bit in upper page N | Decoded bit in upper page N | Statistics around VREF_A | | Statistics around VREF_C | |
| | | | 1 to 0 Count | 0 to 1 Count | 1 to 0 Count | 0 to 1 Count |
| 1 | 0 | 0 | No change | No change | No change | No change |
| 1 | 0 | 1 | +1 | No change | No change | No change |
| 1 | 1 | 0 | No change | +1 | No change | No change |
| 1 | 1 | 1 | No change | No change | No change | No change |
| 0 | 0 | 0 | No change | No change | No change | No change |
| 0 | 0 | 1 | No change | No change | +1 | No change |
| 0 | 1 | 0 | No change | No change | No change | +1 |
| 0 | 1 | 1 | No change | No change | No change | No change |

The counts are generally reset to zero prior to starting the counting for page N. Other designs of the circuit 154 may be implemented to meet the criteria of a particular application. Based on Table I, accurate directional statistics may be obtained from both a lower page read and an upper page read. The directional statistics may be used in the online channel tracking performed by the circuit 102.

Figure 11:
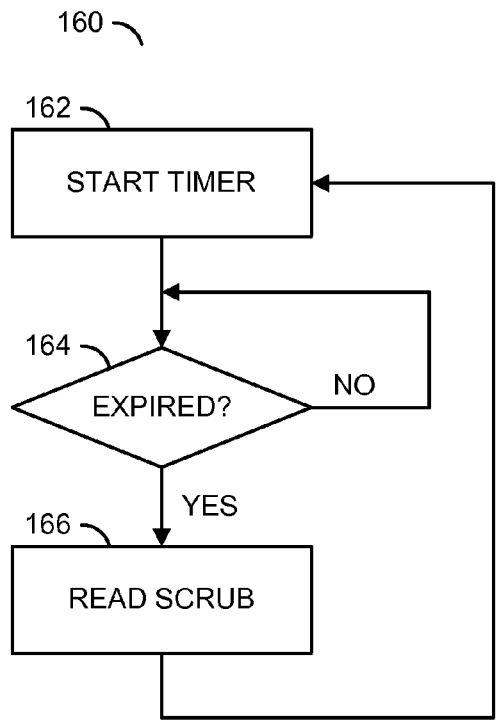
FIG. 11 is a flow diagram of an example implementation of a periodic read scrub method.

Referring to FIG. 11, a flow diagram of an example implementation of a periodic read scrub method 160 is shown. The method (or process) 160 may be implemented in the circuit 100. The method 160 generally comprises a step (or state) 162, a step (or state) 164 and a step (or state) 166. The steps 160 to 166 may represent modules and/or blocks that may be implemented as hardware, software, a combination of hardware and software, or other implementations.

Read scrub, as a background task, may be invoked by the circuit 100 in a periodic fashion. In the step 162, the circuit 108 (or 100) may start a timer. The timer may determine when to initiate a next read scrub. Once the timer has expired per the step 164, the circuit 108 may initiate the next read scrub in the step 166. Depending on the application and on how busy the host read may be, the circuit 100 generally determines an appropriate time and frequency of the read scrubs in order to have minimal impact on normal host reads while still meeting the targets of the read scrub. Several days or even weeks may be used by the read scrub to traverse every page in the circuit 94, depending on the size of the circuit 94 and how the circuit 100 schedules the read scrub.

Figure 12:
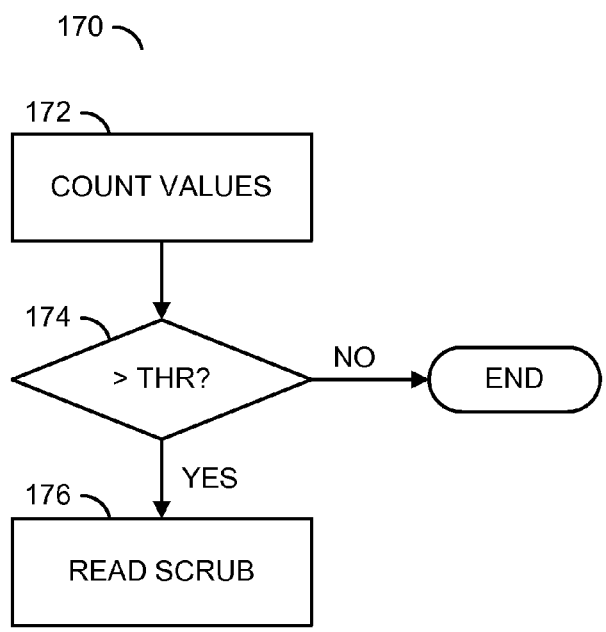
FIG. 12 is a flow diagram of an example implementation of a trigger-based read scrub method.

Referring to FIG. 12, a flow diagram of an example implementation of a trigger-based read scrub method 170 is shown. The method (or process) 170 may be implemented in the circuit 100. The method 170 generally comprises a step (or state) 172, a step (or state) 174 and a step (or state) 176. The steps 170 to 176 may represent modules and/or blocks that may be implemented as hardware, software, a combination of hardware and software, or other implementations.

The circuit 108 generally monitors P/E cycle counts (e.g., PEC) of each R-block. (An R-block is a combination of blocks combined to form a redundant array of silicon independent elements, similar to a redundant array of independent disks for magnetic media.) Assuming that the channel conditions only change gradually throughout the life of the circuit 94, the circuit 108 may choose to initiate online channel tracking only when the PEC of a particular R-block is larger than the PEC of that particular R-block in a last channel parameter update by a certain threshold (e.g., Tpec). The threshold Tpec may be a fixed value (e.g., 100 P/E cycles) or may be made dynamic. For instance, the threshold Tpec may be smaller when the device is young and larger when the device is near an end of life. Additional details regarding high-level redundancy information computations for the R-blocks may be found in WIPO publication WO 2012/099937 A2 (International application PCT/US2012/021682), international publication date of Jul. 26, 2012, which is hereby incorporated by reference in its entirety.

Furthermore, since read scrub monitors total error counts of a group of memory cells, such as a block error count (e.g., BEC), the circuit 108 may choose to initiate online channel tracking only when the total number of errors exceeds a threshold. Monitoring the BEC approach generally takes into account more use conditions than the program/erase cycling.

In the step 172, the circuit 108 may count the values (e.g., PEC and/or EEC) being monitored. If the counted values are below a corresponding threshold in the step 174, the method 170 may end until new counts are available. Otherwise, the circuit 108 may initiate a read scrub in the step 176.

A benefit of doing online tracking during read scrub is that the tracking utilizes no additional reads from the circuit 94 for the tracking. The overhead caused by the tracking on performance may be the computations performed inside the circuit 100 (including firmware and hardware). Even such computational costs may be reduced by intelligent scheduling, such as in the examples of FIG. 12.

The circuit 100 may also perform offline tracking, which utilizes additional reads (other than read scrub) but is generally more accurate. Many ways of scheduling the online channel tracking and the offline channel tracking routines may be implemented to meet the criteria of a particular application. For example, the circuit 100 may choose to skip online tracking in a current read scrub and directly initiate offline tracking after the current read scrub has completed if the current read scrub reveals too many errors or too many read failures that lead to retry reads. In another example, the circuit 100 may schedule the offline channel tracking when the online tracking in a read scrub indicates that there may be a large change in the means and the standard deviations in the state distributions.

The online tracking during read scrub generally tracks multiple channel parameters. The channel parameters may depend on how the Vt distribution of all states in the nonvolatile memory cells are modeled. If the controller models the noise as a Gaussian noise, a mean voltage and a standard deviation are generally sufficient to model each state. If inter-cell interference is taken into account in the model, additional channel parameters may be used. Other parameters may be modeled and tracked to meet the criteria of a particular application.

Figure 13:
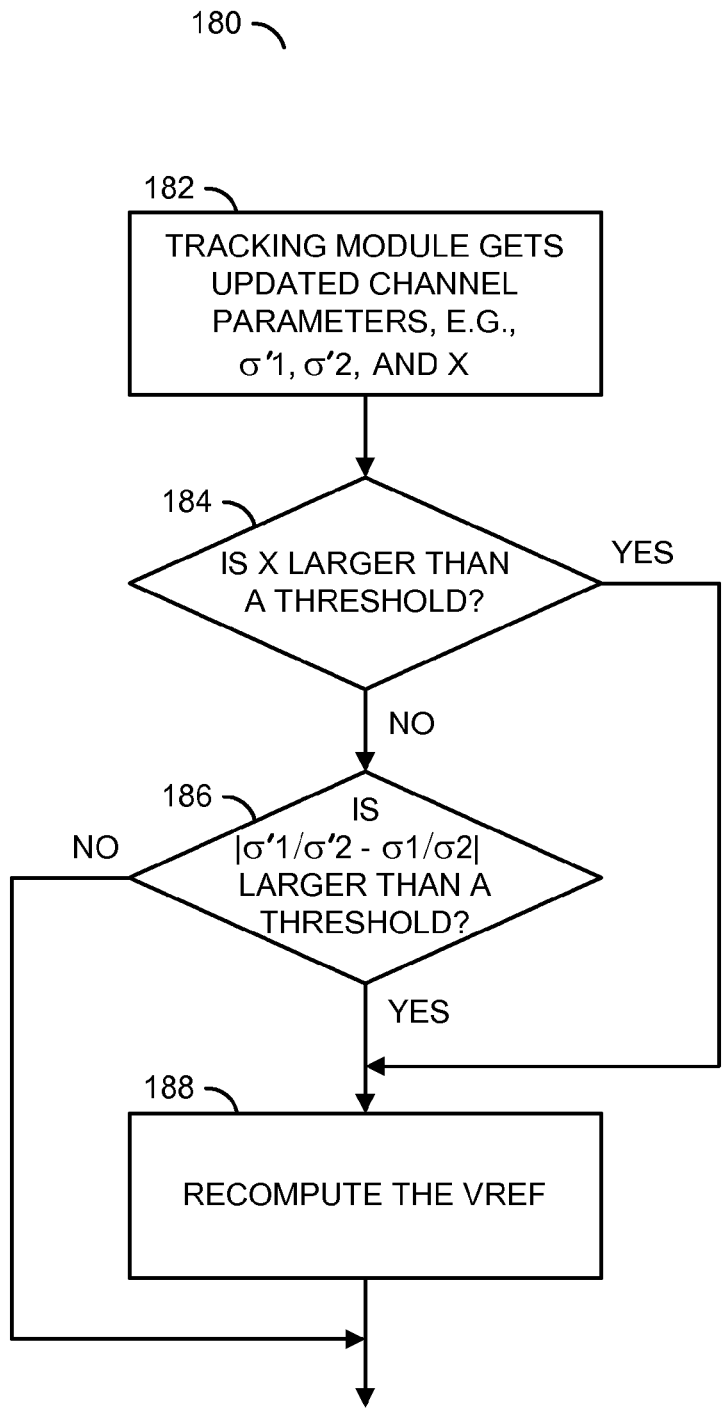
FIG. 13 is a flow diagram of an example method for determining when to adjust reference voltages.

Referring to FIG. 13, a flow diagram of an example method 180 for determining when to adjust the reference voltages based on the updated parameters is shown. The method (or process) 180 may be implemented in the circuit 100. The method 180 generally includes a step (or state) 182, a step (or state) 184, a step (or state) 186 and a step (or state) 188. The steps 182-188 may represent modules and/or blocks that may be implemented as hardware, software, a combination of hardware and software, or other implementations.

In the step 182, the circuit 100 may calculate the updated channel parameters (e.g., σ'1, σ'2 and x). A check is generally performed by the circuit 106 in the step 184 to determine if the updated parameter (voltage shift) X is larger than a threshold. If the updated parameter X is larger than the threshold, another check may be performed by the circuit 106 in the step 186. The step 186 generally determines if an absolute value of difference between two ratios (e.g., |(σ'1/σ'2)−(σ1/σ2)|) is larger than another threshold. If one or both checks in the steps 184 and 186 are positive, the circuit 106 generally recomputes the reference voltage in the step 188. If both checks in the steps 184 and 186 are negative, the method 180 may end without updating the reference voltage.

Figure 14:
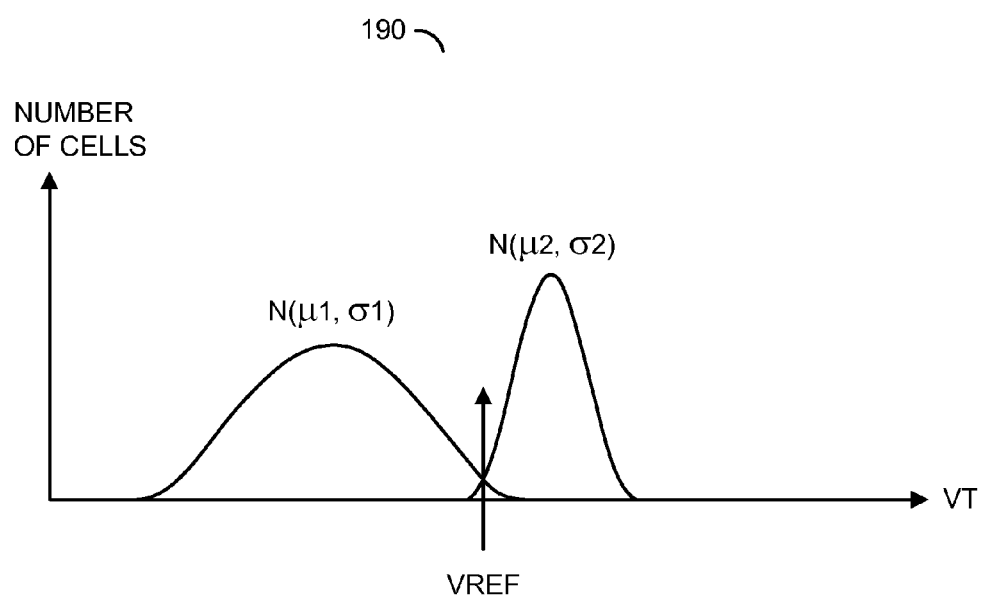
FIG. 14 is a diagram of example overlapping change distribution states.

Referring to FIG. 14, a diagram of example overlapping change distribution states 190 is shown. By tracking the channel parameters during the read scrubs, the circuit 100 may calculate a reference voltage (e.g., voltage VREF in the figure) that may minimize a probability of erroneously reading data from the circuit 94. If a soft decision ECC decoder is used, such timely tracked channel parameters may be used to compute log likelihood ratios that may be sent to the ECC decoder, therefore improving a success rate of ECC decoding. If such a computation has a nontrivial impact on the performance, the circuit 100 may reduce the frequency of invoking the computation by using another routine (e.g., the method 180) to determine when to adjust the voltage Vref for the hard-decision reads.

Performing the channel tracking during read scrubs may provide several improvements in the performance of the apparatus 90. The improvements may include, but are not limited to, one or more of the following.

1. No additional reads are generally performed because (i) read scrub is already used in nonvolatile memory and (ii) the online channel tracking uses the read scrub to gather statistics. Therefore, a performance penalty of channel tracking is minimized.

2. For MLC type devices, accurate directional statistics may be obtained for the regions around voltages VREF_A and VREF_C, without an "additional" read of the lower page.

By combining the channel tracking with the read scrub, both the lower page and the upper page may be read during the read scrub anyway.

3. While some MLC channel tracking methods rely on perfect randomization, the circuit 100 does not rely on such criteria. By buffering the lower page post correction, the circuit 100 may be able to count the number of memory cells falling in each of the four states.

The functions performed by the diagrams of FIGS. 1-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a first circuit configured to (i) read data from a region of a memory circuit during a read scrub of said region, (ii) perform an error correction of said data and (iii) generate a plurality of statistics based on (a) said data and (b) one or more bit flips performed during said error correction, wherein (a) said memory circuit is configured to store said data in a nonvolatile condition and (b) one or more reference voltages are used to read said data; and
a second circuit configured to (i) update a plurality of parameters of said region based on said statistics and (ii) compute updated values of said reference voltages based on said parameters, wherein said parameters of said region track one or more mean threshold voltages in said region.

2. The apparatus according to claim 1, wherein (i) said memory circuit comprises a flash memory, (ii) said memory circuit is configured to store said data by adjusting a plurality of respective charge states in a plurality of memory cells, (iii) said respective charge states establish said one or more mean threshold voltages in said region and (iv) said parameters of said region track a respective spread of said threshold voltages about said one or more mean threshold voltages in said region.

3. The apparatus according to claim 1, wherein (i) said first circuit is further configured to calculate a difference in said data between a number of zero values and a number of one values, and (ii) said generation of said statistics is based on said difference.

4. The apparatus according to claim 1, wherein (i) said memory circuit comprises a plurality of memory cells, (ii) each of said memory cells stores a plurality of bits and (iii) said bits are arranged as a plurality of pages, one of said bits from each respective one of said memory cells in a respective one of said pages.

5. The apparatus according to claim 1, wherein said first circuit is further configured to generate an additional one or more of said statistics based only on (i) a first page of said region that has been error corrected, (ii) a second page of said region that has been error corrected and (iii) said second page as received from said memory circuit without being error corrected.

6. The apparatus according to claim 1, wherein a second of a plurality of pages in said region is read from a set of memory cells immediately after a first of said pages has been read from said set of said memory cells.

7. The apparatus according to claim 1, wherein said parameters of said region are updated at a plurality of specified time intervals.

8. The apparatus according to claim 1, wherein (i) said parameters of said region are updated at each of a plurality of said read scrubs of said region and (ii) said first circuit is further configured to determine when to adjust said reference voltages used in said region based on said updating of said parameters.

9. The apparatus according to claim 1, wherein said apparatus is implemented in a solid state drive controller.

10. The apparatus according to claim 1, wherein said apparatus is implemented as one or more integrated circuits.

11. A method for read scrub channel tracking, comprising the steps of:
(A) reading data from a region of a memory circuit during a read scrub of said region, wherein (i) said memory circuit is configured to store said data in a nonvolatile condition and (ii) one or more reference voltages are used to read said data;
(B) performing an error correction of said data;
(C) generating a plurality of statistics based on (i) said data and (ii) one or more bit flips performed during said error correction;
(D) updating a plurality of parameters of said region based on said statistics; and
(E) computing updated values of said reference voltages based on said parameters, wherein said parameters of said region track one or more mean threshold voltages in said region.

12. The method according to claim 11, wherein (i) said memory circuit comprises a flash memory, (ii) said memory circuit is configured to store said data by adjusting a plurality of respective charge states in a plurality of memory cells, (iii) said respective charge states establish said one or more mean threshold voltages in said region and (iv) said parameters of said region track a respective spread of said threshold voltages about said one or more mean threshold voltages in said region.

13. The method according to claim 11, further comprising the step of:
calculating a difference in said data between a number of zero values and a number of one values, wherein said generation of said statistics is based on said difference.

14. The method according to claim 11, wherein (i) said memory circuit comprises a plurality of memory cells, (ii) each of said memory cells stores a plurality of bits and (iii) said bits are arranged as a plurality of pages, one of said bits from each respective one of said memory cells in a respective one of said pages.

15. The method according to claim 11, further comprising the step of:
generating an additional one or more of said statistics based only on (i) a first page of said region that has been error corrected, (ii) a second page of said region that has been error corrected and (iii) said second page as received from said memory circuit without being error corrected.

16. The method according to claim 11, wherein a second of a plurality of pages in said region is read from a set of memory cells immediately after a first of said pages has been read from said set of said memory cells.

17. The method according to claim 11, wherein said parameters of said region are updated at a plurality of specified time intervals.

18. The method according to claim 11, wherein said parameters of said region are updated at each of a plurality of said read scrubs of said region, the method further comprising the step of:

determining when to adjust said reference voltages used in said region based on said updating of said parameters.

19. The method according to claim 11, wherein said method is implemented in a solid state drive controller.

20. An apparatus comprising:

means for reading data from a region of a memory circuit during a read scrub of said region, wherein (i) said memory circuit is configured to store said data in a nonvolatile condition and (ii) one or more reference voltages are used to read said data;

means for performing an error correction of said data;

means for generating a plurality of statistics based on (i) said data and (ii) one or more bit flips performed during said error correction;

means for updating a plurality of parameters of said region based on said statistics; and means for computing updated values of said reference voltages based on said parameters, wherein said parameters of said region track one or more mean threshold voltages in said region.

\* \* \* \* \*